United States Patent
Patino et al.

(10) Patent No.: US 11,525,409 B2
(45) Date of Patent: Dec. 13, 2022

(54) TEMPERATURE BASED GAS TURBINE CONTROL AND METHOD

(71) Applicant: General Electric Company, Schenectady, NY (US)

(72) Inventors: Erick Novoa Patino, Queretaro (MX); Guillermo Delgado Ramirez, Queretaro (MX); Uriel Eduardo Soria Moreno, Queretaro (MX)

(73) Assignee: General Electric Company, Schenectady, NY (US)

( * ) Notice: Subject to any disclaimer, the term of this patent is extended or adjusted under 35 U.S.C. 154(b) by 190 days.

(21) Appl. No.: 17/034,801

(22) Filed: Sep. 28, 2020

(65) Prior Publication Data
US 2022/0099034 A1 Mar. 31, 2022

(51) Int. Cl.
F02C 9/28 (2006.01)
(52) U.S. Cl.
CPC ............ F02C 9/28 (2013.01); *F05D 2270/02* (2013.01); *F05D 2270/303* (2013.01); *F05D 2270/304* (2013.01); *F05D 2270/313* (2013.01)
(58) Field of Classification Search
CPC ........................................................ F02C 9/28
See application file for complete search history.

(56) References Cited

U.S. PATENT DOCUMENTS

| | | | |
|---|---|---|---|
| 4,380,894 | A | 4/1983 | Abo et al. |
| 9,665,077 | B2 | 5/2017 | Jordan, Jr. et al. |
| 2011/0094238 | A1* | 4/2011 | Mosley ............... F02C 9/28 60/773 |

(Continued)

FOREIGN PATENT DOCUMENTS

| | | |
|---|---|---|
| EP | 0279487 A2 | 8/1988 |
| EP | 1231369 A2 | 8/2002 |

(Continued)

OTHER PUBLICATIONS

Kurz, et al., "Gas Turbine Performance—What Makes the Map?", Proceedings of the 29th Turbomachinery Symposium, pp. 247-262, published in 2000, accessed at https://oaktrust.library.tamu.edu/bitstream/handle/1969.1/163362/t29pg247.pdf?sequence=1 &isAllowed=y on May 31, 2022 (Year: 2000).*

(Continued)

*Primary Examiner* — Scott J Walthour
(74) *Attorney, Agent, or Firm* — James Pemrick; Charlotte Wilson; Hoffman Warnick LLC (57) ABSTRACT

A method for operating a gas turbine at a desired gas turbine production value. The method includes setting a desired gas turbine production value based on a schedule of a reference gas turbine shaft speed with respect to ambient temperature and an exhaust temperature; comparing values of a gas turbine shaft speed to the reference gas turbine shaft speed to determine whether a difference between the gas turbine shaft speed and the reference gas turbine shaft speed is within or outside of a predetermined range; and in response to the difference being outside of the predetermined range, initiating a change in gas turbine shaft speed to cause the gas turbine to operate approximately at the desired gas turbine production value.

17 Claims, 3 Drawing Sheets

(56) References Cited

U.S. PATENT DOCUMENTS

| | | | |
|---|---|---|---|
| 2015/0253010 A1* | 9/2015 | Schlein | F23D 17/002 60/776 |
| 2016/0305333 A1* | 10/2016 | Morgan | F02C 9/00 |
| 2017/0138273 A1 | 5/2017 | Gassner et al. | |
| 2017/0211487 A1 | 7/2017 | Zhang et al. | |
| 2019/0383222 A1 | 12/2019 | Takaki et al. | |

FOREIGN PATENT DOCUMENTS

| | | |
|---|---|---|
| EP | 2886835 A1 | 6/2015 |
| KR | 20190071820 A | 6/2019 |

OTHER PUBLICATIONS

International Search Report for corresponding EP Application No. 21197258.3-1007 dated Feb. 18, 2022; 7 pages.

\* cited by examiner

TEMPERATURE BASED GAS TURBINE CONTROL AND METHOD

BACKGROUND

The subject matter disclosed herein relates generally to turbomachinery systems, such as gas turbine engines (hereinafter "gas turbine"). Specifically, the subject matter relates to methods and systems for controlling a gas turbine system.

In a turbine system, the firing temperature is the temperature produced within the turbine's combustion system, e.g., flame temperature. Firing control algorithms may determine how to derive a desired firing temperature and then provide the actual firing temperature of the turbine by controlling, for example, combustion production generated by the gas turbine system. The firing control algorithms may determine the desired firing temperature based on turbine parameters such as exhaust temperature, compressor pressure ratio, and compressor inlet temperature.

Conventional firing control algorithms incorporate static assumptions about the gas turbine operating environment and component performance. Current firing control algorithms also consider the gas turbine operating states and constraints interdependent with each other. An accuracy of the firing temperature control and the level of performance associated with these firing control algorithms may decrease as the gas turbine ages, and the algorithms may require seasonal tuning because of such assumptions and state interdependency. Conventional algorithms do not generally take into account variations in ambient operating conditions, such as seasonal variations in ambient air temperature and humidity. Rather, conventional algorithms generally assume that ambient conditions, e.g., humidity, compressor inlet pressure loss and turbine back pressure, remain at certain defined conditions or that variations in these conditions do not affect the target exhaust turbine temperature.

Certain firing control algorithms, such as model based control (MBC) algorithms, may incorporate variations in a gas turbine operating environment and/or component performance over time. MBC firing control algorithms may treat a gas turbine's various operating states and constraints as independent states, leading to more accurate firing temperature control and increased levels of performance. However, implementing MBC firing control algorithms may require a complete overhaul of the gas turbine controller's software and/or hardware by a qualified technician, which can be slow and expensive.

BRIEF DESCRIPTION

A first aspect of the disclosure provides a method for operating a gas turbine at a desired gas turbine production value. The method includes setting a desired gas turbine production value based on a schedule of a reference gas turbine shaft speed with respect to ambient temperature and an exhaust temperature; comparing values of a gas turbine shaft speed to the reference gas turbine shaft speed to determine whether a difference between the gas turbine shaft speed and the reference gas turbine shaft speed is within or outside of a predetermined range; and in response to the difference being outside of the predetermined range, initiating a change in gas turbine shaft speed to cause the gas turbine to operate approximately at the desired gas turbine production value.

A second aspect of the disclosure provides apparatus for operating a gas turbine at a desired gas turbine production value. The apparatus includes a control comprising at least one temperature matching algorithm, the at least one temperature matching algorithm provided on a computer processor. The computer processor operable to store computer-executable instructions operable to set a desired gas turbine production value based on a schedule of a reference gas turbine shaft speed with respect to ambient temperature and an exhaust temperature; compare values of the gas turbine shaft speed to the reference gas turbine shaft speed to determine whether a difference between the gas turbine shaft speed and the reference gas turbine shaft speed is within or outside of a predetermined range; and in response to the difference being outside of the predetermined range, initiating a change in gas turbine shaft speed to cause the gas turbine to operate approximately at the desired gas turbine production value.

A third aspect of the disclosure provides a non-transitory computer-readable medium comprising computer-executable instructions for operating a gas turbine, the instructions comprising instruction for setting a desired gas turbine production value based on a schedule of a reference gas turbine shaft speed with respect to ambient temperature and an exhaust temperature; comparing values of a gas turbine shaft speed to a reference gas turbine shaft speed to determine whether a difference between the gas turbine shaft speed and the reference gas turbine shaft speed is within or outside of a predetermined range; and in response to the difference being outside of the predetermined range, initiating a change in gas turbine shaft speed to cause the gas turbine to operate approximately at the desired gas turbine production value.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

As an initial matter, in order to clearly describe the current technology it will become necessary to select certain terminology when referring to and describing relevant machine components within a gas turbine and a gas turbine control system. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the engine, and "aft" referring to the rearward or turbine end of the engine.

It is often required to describe parts that are disposed at differing radial positions with regard to a center axis. The term "radial" refers to movement or position perpendicular to an axis. For example, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

In addition, several descriptive terms may be used regularly herein, as described below. The terms "first", "second", and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Where an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Figure 1:
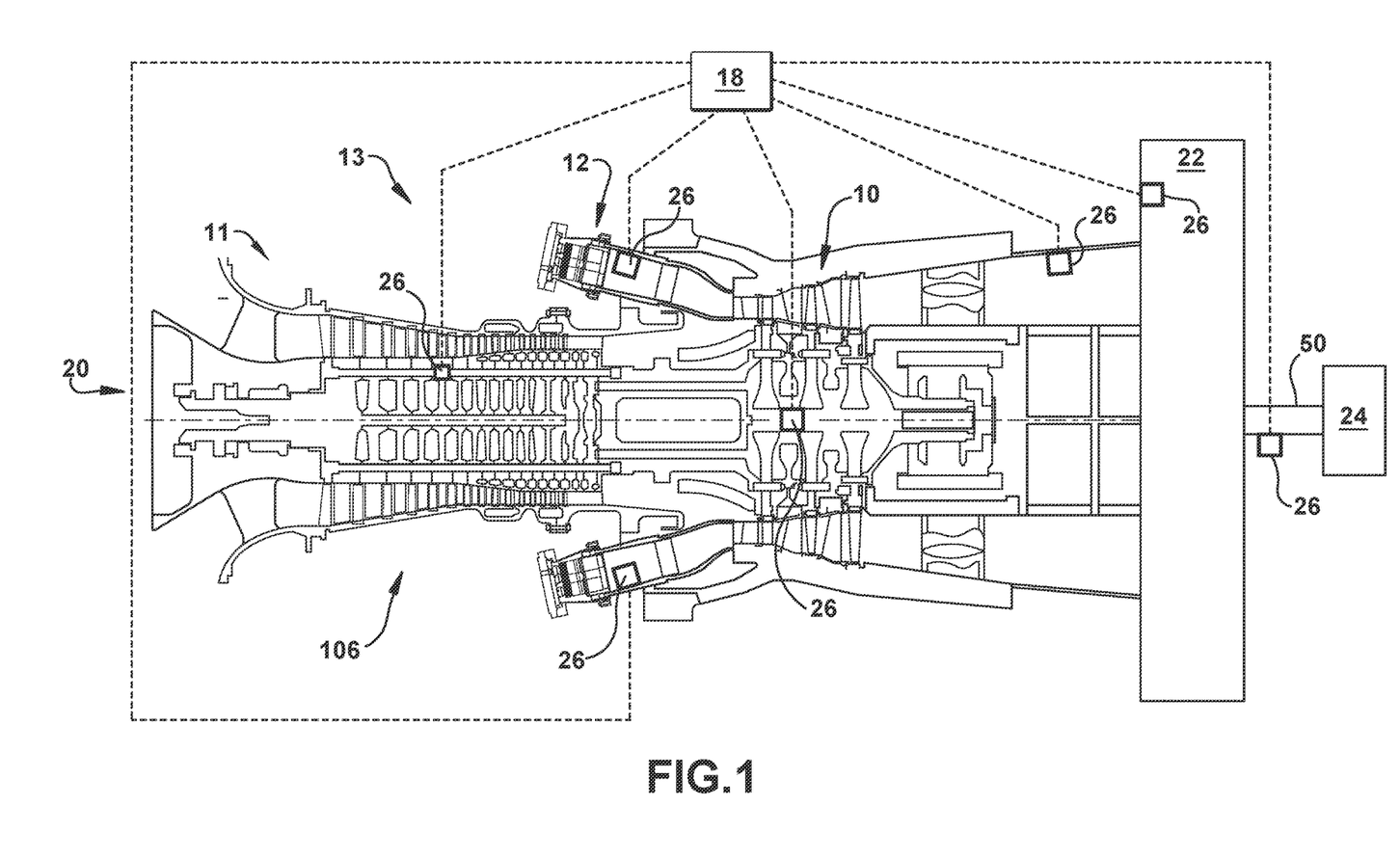
FIG. 1 is an example schematic of a system for determining a target exhaust temperature for a gas turbine, according to an embodiment of the disclosure.

FIG. 1 depicts a gas turbine assembly 13 having a compressor 11, combustor 12, gas turbine 10 drivingly coupled to compressor 11 and a control system 18 (hereinafter "control"). An inlet 20 to compressor 12 feeds ambient air and possibly injected water to compressor 12. Inlet 20 may have ducts, filters, screens and sound absorbing devices that each may contribute to a pressure loss of ambient air flowing through inlet 20 into inlet guide vanes 21 of compressor 12. Gas turbine 10 of FIG. 1 can be an aeroderivative gas turbine (gas turbine) in which embodiments of the present disclosure may be used. Examples of such aeroderivative gas turbine engines include the LMS100, LM2500, LM6000, LM1800e, LM1600, and TM2500 series of aeroderivative gas turbines manufactured by General Electric Company of Schenectady, N.Y. It will be understood by those skilled in the art that the present embodiments are not limited to this type of gas turbine. The present embodiments may be used in combustion turbine engines, such as the engines used in power generation and airplanes, steam turbine engines, and other type of rotary engines.

An exhaust 22 for gas turbine 10 directs combustion gases from the outlet of gas turbine 10 through ducts having, for example, emission control and sound absorbing devices. Exhaust 22 applies a back pressure to gas turbine 10. The amount of back pressure may vary over time due to the addition of components to exhaust 22, and to dust and dirt clogging the exhaust passages. Gas turbine 10 may drive a shaft 50 connected to a generator 24 that produces electrical power (megawatts (MW) production) or "gas turbine production."

The operation of the gas turbine may be monitored by several sensors 26 detecting various conditions of the turbine, generator and environment. At least one sensor 26 is positioned at or in exhaust 22 of gas turbine 10 to sense temperatures of exhaust from combustor 12 and gas turbine 10. In one aspect as embodied by the disclosure, more than one sensor 26 can be provided, for instance and in no manner limiting of the embodiments, 2, 3, 4, 5, 6, 7, 8 or more sensors 26 can be positioned at or in exhaust 22. It is a general gas turbine operating principle that the exhaust temperature of a gas turbine is reflective and generally proportional of power being generated by a gas turbine.

Further, temperature sensors may monitor ambient temperature surrounding the gas turbine, compressor discharge temperature, turbine exhaust gas temperature, and other temperature measurements of the gas stream through the gas turbine. Any number of temperature sensors may be provided at or in the above locations, as embodied by the disclosure.

Additionally, at least one sensor 26 is positioned on, at, or in the shaft/rotor 50 (hereinafter "shaft" for ease of description) to determine a turbine shaft speed (NPT). Turbine shaft speed (NPT) will be evaluated in one aspect of the embodiments to determine a turbine shaft speed differential needed to either increase or decrease shaft speed to reach a desired production by the gas turbine 10, as described hereinafter.

Sensors 26 may also comprise flow sensors, speed sensors, flame detector sensors, valve position sensors, guide vane angle sensors, or the like that sense various parameters pertinent to the operation of gas turbine 10. As used herein, "parameters" and similar terms refer to items that can be used to define the operating conditions of turbine, such as temperatures, pressures, and flows at defined locations in the turbine that can be used to represent a given turbine operating condition.

Control 18 can include a MARK™ or SPEEDTRONIC™ Gas Turbine Control System from General Electric Company of Schenectady, N.Y. MARK and SPEEDTRONIC are trademarks of General Electric Company of Schenectady, N.Y. Control 18 may include a computer or computer system including a memory. The computer system may include a processor(s) that executes programs to control the operation of the gas turbine using data input from sensors 26 or other sources, and instructions from human operators via, e.g., a human machine interface (HMI). Programs executed by control 18 may include scheduling algorithms for regulating fuel flow to the combustor 12. Combustion gases flow out exhaust 22, where the exhaust temperature can be determined by temperature sensor 26 in exhaust 22 or on exhaust 22. The commands generated by control 18 cause actuators on the gas turbine to, for example, adjust valves between the fuel supply and combustors that regulate the flow and type of fuel, inlet guide vanes on the compressor 11, and other control settings on gas turbine 10.

Control 18 regulates the gas turbine based, in part, on temperature matching algorithm 25 stored in computer memory of the controller. Temperature matching algorithm 25 enables control 18 to maintain gas turbine 10 within certain predefined operating conditions and limits, and to maintain combustor firing temperatures to within predefined temperature limits.

Control 18 receives as data or inputs measurements of the exhaust temperature of gas turbine 10, as well as other variables of gas turbine 10 operation, and in certain embodiments, control 18 receives data or inputs from sensors 26 or other sources. Control 18 for combustion systems can rely on turbine exhaust temperature to determine an operating condition, e.g., turbine exhaust temperature, of gas turbine 10 to manage electrical power or gas turbine production (MW).

Ambient temperature is a factor to be considered in control 18 determining an operating condition, as increased ambient temperature lowers the density of gas turbine inlet air, thus reducing the mass flow through gas turbine, and therefore reduces the power output (which is proportional to the mass flow). Changes in ambient temperature have an impact on full load power and heat rate of a gas turbine, but also on part-load performance and optimum power turbine speed. At constant speed, where the volume flow remains approximately constant, the mass flow will increase with decreasing temperature and will decrease with increasing temperature. Changes in ambient temperature have an impact on full load power and heat rate of a gas turbine, but also on part-load performance and optimum power turbine speed.

A relationship between gas turbine production and gas turbine exhaust temperature may be generally nonlinear for most gas turbines. Moreover, a relationship between production and exhaust temperature may not be the same from site to site even with the same gas turbine. The lack of consistency and linearity in the relationship between production and gas turbine exhaust temperature can be due to several factors, including but not limited to, ambient temperature, fuel constituents, ambient humidity, elevation, inlet cooling, fuel heating, and other factors.

Figure 2:
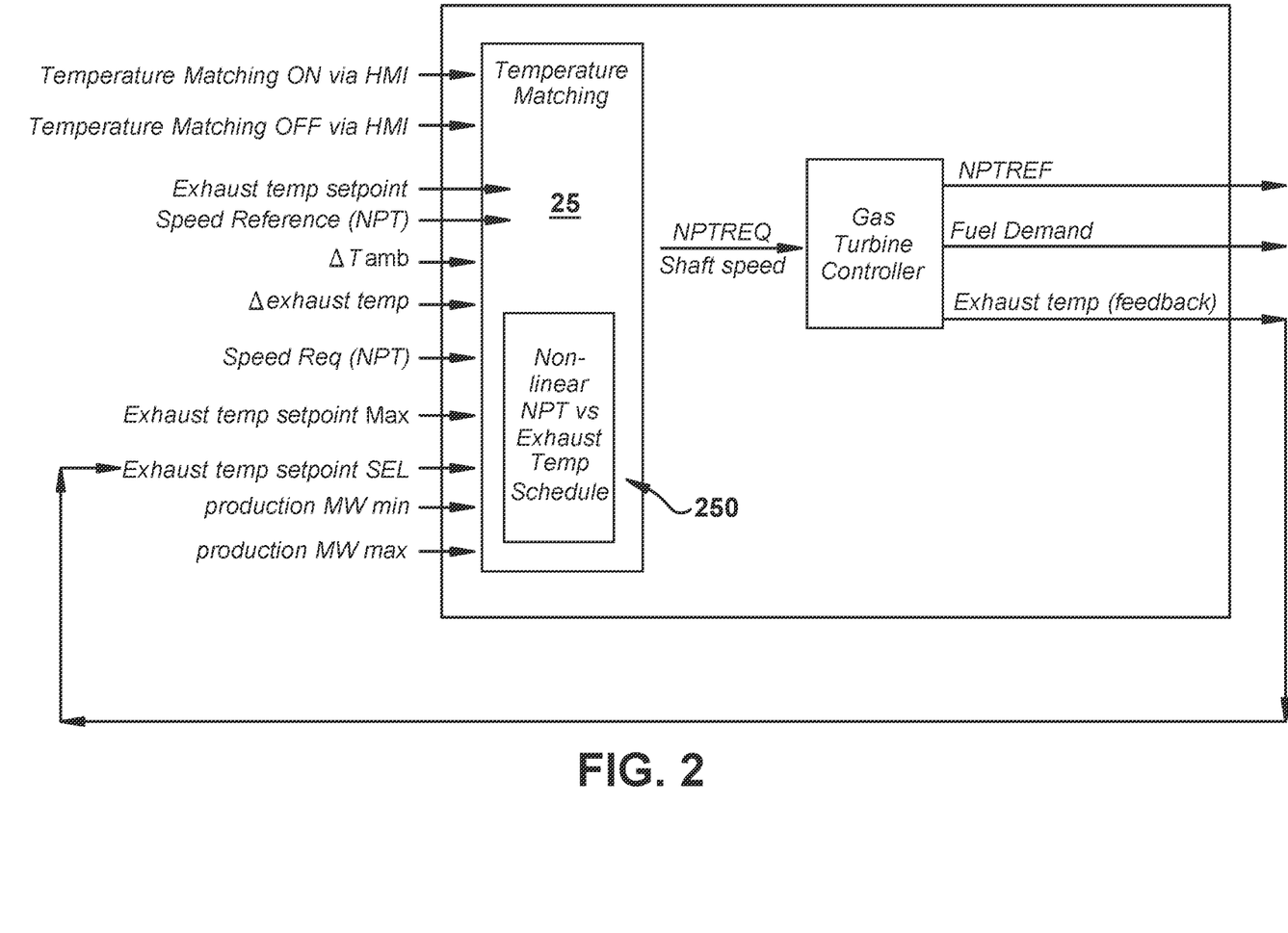
FIG. 2 is a schematic illustrating the data flow for determining turbine shaft speed differential (NPT) determination, according to an embodiment of the disclosure.
Figure 3:
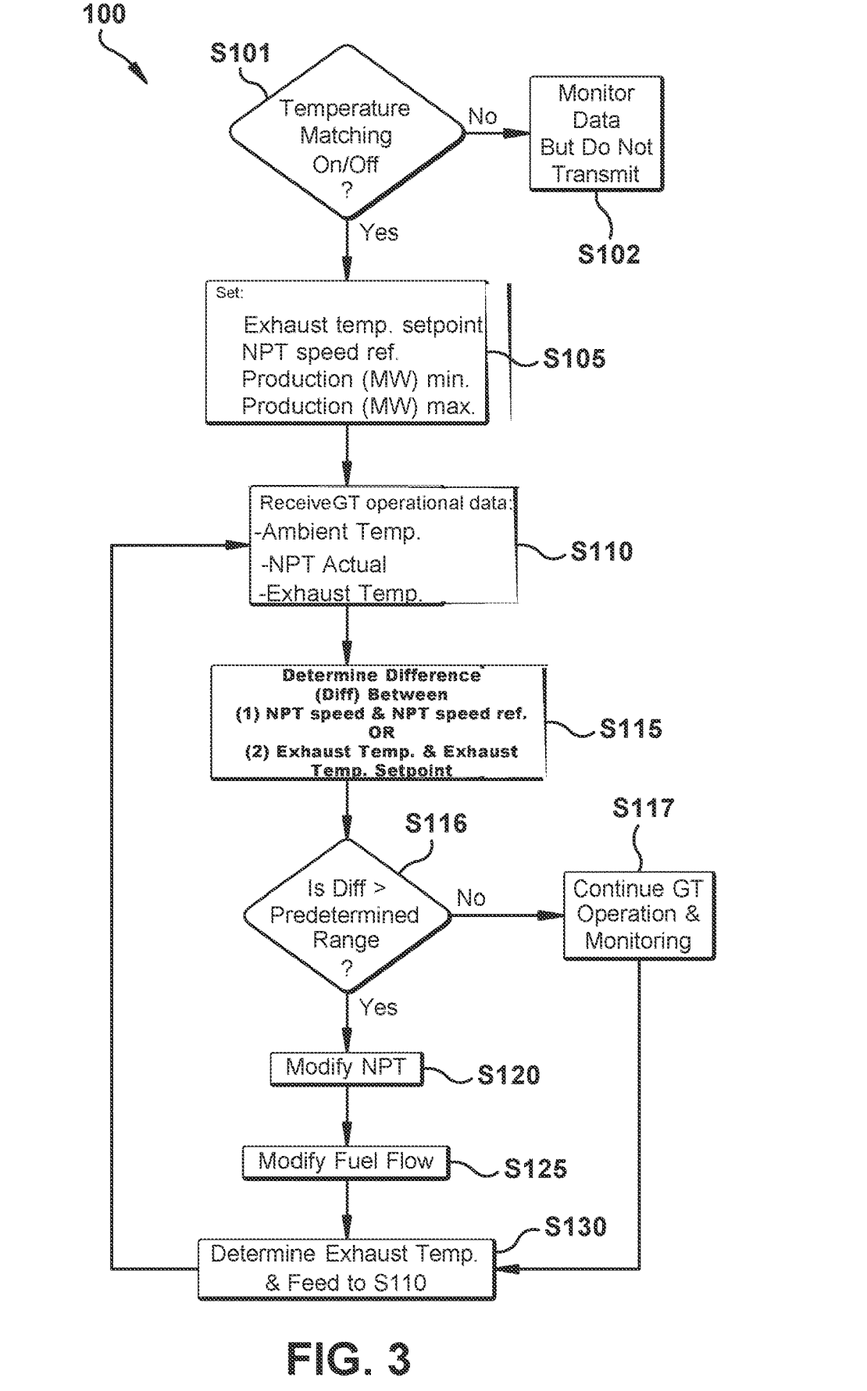
FIG. 3 is a flow chart of a method, according to an embodiment of the disclosure.

FIG. 2 illustrates data flow for determining turbine shaft speed differential (NPT) determination, according to an embodiment of the disclosure, to modify operation of gas turbine 10 on an enhanced/optimized production according to the turbine exhaust gas temperature. FIG. 3 is a flow chart of a process, as embodied by the disclosure. With reference to FIG. 2 and the method 100 as illustrated in FIG. 3, method 100, as embodied by the disclosure, controls an exhaust temperature of gas turbine 10. Control method 100 can be realized by regulating fuel demand and flow to gas turbine 10, as described hereinafter. Control 18 utilizes a shaft speed (NPT) that corresponds to shaft 50 that is coupled to a load, such as but not limited to a generator, mechanical drive, or other machinery, to modify fuel demand and flow, and therefore gas turbine production.

With reference to FIG. 2, data or inputs to control 18 in accordance with the process, as embodied by the disclosure, are shown. Data are provided to temperature matching module temperature matching algorithm 25 of control 18. Data include but are not limited to:

Temperature Matching ON via HMI. This input is provided by an HMI connected to control 18 for an operator to select/enable this functionality.

Temperature Matching ON via HMI. This input is provided by an HMI connected to control 18 for an operator to select/disable this functionality.

Exhaust temperature setpoint which is set as desired by the operator.

Shaft speed reference (NPT) that corresponds to a shaft speed, such as a gas turbine shaft that is coupled to an electric generator or other load. This speed is used by control 18 and its algorithms and software to control the fuel flow.

$\Delta$Tamb is the change in ambient temperature that is used to calculate production from gas turbine system.

$\Delta$exhaust temp is exhaust temperature setpoint minus sensed exhaust temperature.

Speed Reference (NPT) is a gas turbine fuel flow regulator value based on the sensed shaft speed (NPT) that is connected to an electric generator or other load.

Speed Req. (NPT) is a value used by temperature matching algorithm 25 in control 18 to confirm that speed reference is enabled at control 18.

Exhaust temp setpoint MAX is the maximum exhaust temperature permitted on engine software set by an operator of gas turbine 10.

Exhaust temp setpoint SEL is the average of temperature sensors located on exhaust 22. Exhaust temp setpoint SEL is an output from control 18 and re-input to temperature matching algorithm 25.

Production MW min is a minimum production (in megawatts) allowed to produce power. This is normally a constant for a given gas turbine, for example, 1.5 MW.

Production MW max is a maximum production (in megawatts) allowed to produce power. This limit is calculated by control 18.

NPTREQ is the shaft speed to achieve the exhaust temperature setpoint.

NPTREF is a shaft speed reference set in temperature matching algorithm 25 in control 18 for gas turbine 10. NPTREF=NPTREQ−NPT.

Exhaust temp (feedback) is the same as exhaust temp setpoint SEL but an input value to temperature matching algorithm 25.

In certain aspects, as embodied by the disclosure, exhaust temperature sensor obtains an exhaust temperature sensor value. Exhaust temperature sensor value is then compared to an exhaust temperature setpoint, which is a desired exhaust temperature of gas turbine 10 to provide enhanced and desired gas turbine output in which gas turbine 10 operates at its highest desired and required efficiency. A fuel demand and flow is based on shaft speed (NPT) and is directly proportional to the exhaust temperature. Controlling the temperature of a gas turbine, and of course the resultant exhaust temperature, limits exhaust gas temperature by reducing fuel flow, as the air flow decreases with the shaft speed. Conversely, to increase shaft speed, increasing fuel flow and gas turbine output increases temperature of a gas turbine and resultant exhaust temperature.

Temperature matching algorithm 25 references a schedule 250 of shaft speed (NPT) and exhaust temperature, factoring in ambient temperature. Schedule 250 includes an alignment comparison of shaft speed to exhaust temperatures, as there is a direct correlation of gas turbine shaft speed to a load to an exhaust temperature of the gas turbine. For a given gas turbine, a schedule can be provided relating gas turbine exhaust temperature to gas turbine shaft speed, which can be accessed by temperature snatching algorithm 25 referencing schedule 250.

Further, in certain aspects of the embodiments, production of generator 24 is proportional to gas turbine 10 operation. Whereas, generator 24 is connected to gas turbine 10 by shaft 50, the production of generator 24 is also proportional to fuel demand to gas turbine 10 to provide enhanced and desired gas turbine output.

Thus, both exhaust temperature of gas turbine 10 and production of a generator are connected to shaft 50, and are therefore proportional to shaft speed (NPT). Both exhaust temperature of gas turbine 10 and production of a generator are also proportional to fuel demand for desired production of gas turbine assembly 13. Therefore, shaft speed (NPT) is directly related to fuel demand. Accordingly, shaft speed (NPT) is a variable of gas turbine 10 operation that can be used to adjust fuel demand that will be calculated by control 18 to provide enhanced and desired gas turbine output.

Referring to FIG. 2 and FIG. 3, during the method of operation 100 (described in further detail hereinafter), a gas turbine operator can actuate control 18 by initiating temperature matching algorithm 25 in control 18. The initiating in S101 includes setting temperature matching algorithm "On" or Off" by a gas turbomachinery operator via a Human Machine Interface (HMI). Initiating on temperature matching algorithm 25 in control 18 will enable data, e.g., sensor readings, from gas turbine 10 exhaust 22 to be analyzed for enhancing operation of gas turbine 10. In addition, regardless of HMI being turned on for method 100, sensors 26 can monitor gas turbine 10 at S102 and related performance characteristics of gas turbine 10 during gas turbine 10 operation. Thus, once gas turbomachinery operator initiates temperature matching at HMI, sensor readings can be analyzed in real time.

Gas turbomachinery operator can set various "fixed" values for temperature matching and methodology at S105. These fixed values include, but are not limited to, a desired gas turbine production value based on a schedule of a reference gas turbine shaft speed with respect to ambient temperature, an exhaust temperature setpoint, shaft speed (NPT) reference, production (MW) maximums, and production (MW) minimums.

At S110, control 18 receives data, e.g., from sensor(s) 26 or other sources, for ambient temperature, sensed exhaust temperature, and sensed shaft speed (NPT). Sensed exhaust temperature can be compared to a desired exhaust temperature setpoint for operating gas turbine 10, at S115, by temperature matching algorithm 25. More particularly, at S115, temperature matching algorithm 25 can determine a difference between the gas turbine shaft speed and the reference gas turbine shaft speed is within or outside of a predetermined range.

At S116, the comparison determines if the difference between the gas turbine shaft speed and the reference gas turbine shaft speed is within or outside of a predetermined range is greater that the predetermined range (described hereinafter). The difference can be either the sensed exhaust temperature being higher than the desired exhaust temperature setpoint or the sensed exhaust temperature being lower than a desired exhaust temperature setpoint, control 18 initiates action and modifies shaft speed (NPT) at S120. Of course, if temperature matching S101 has not been initiated, method 100 is not enacted, but as noted above, sensing can continue at S102, if a turbomachinery operator later determines the need to initiate temperature matching. The predetermined range can be characterized as an error or deviation between a sensed exhaust temperature and desired exhaust temperature setpoint.

In addition, if the comparison at S116 indicates a difference that is not outside of the predetermined range (described hereinafter), control 18 determines that gas turbine 10 is operating in a condition where desired production can be reached. Thus, no action is initiated by control 18, and gas turbine 10 operation continues at S117. Monitoring is continued and an exhaust temperature with continued monitoring by method 100 at S130.

In response to the sensed exhaust temperature and desired exhaust temperature setpoint difference exceeding the predetermined range, gas turbine shaft speed (NPT) is changed at S120 to cause the gas turbine to operate approximately at the desired gas turbine production value, which is acceptable for a temperature gradient of the temperature matching process. A magnitude of the ramp is equal to the sensed exhaust temperature and desired exhaust temperature setpoint difference so that when the sensed exhaust temperature and desired exhaust temperature setpoint difference is negative the rate of change of the fuel demand, step S125, is reduced or negative. When a sensed exhaust temperature and desired exhaust temperature setpoint difference is positive a rate of change of the fuel demand, and accordingly fuel flow S125, is increased or positive.

After initiating a change in gas turbine shaft speed at S120 and modifying fuel flow S125 in response to the difference being outside of the predetermined range, gas turbine 10 can operate approximately at the desired gas turbine production value. Additionally, sensors 26 continue to monitor and sense exhaust temperature of gas turbine 10 at S130. This sensed exhaust temperature of gas turbine 10 can be fed back to method 100 as an input at S110. Thus, method 100 receives real time sensed data or inputs and continues to operate until the temperature matching algorithm at S115 determines that sensed shaft speed (NPT) is outside of predetermined range. At that point, method 100 modifies shaft speed (NPT) at S120, and method 100 continues as discussed above.

As embodied by the disclosure, a rate of change of the fuel flow is adjustable to fit any temperature gradients or characteristics required by downstream thermomechanical devices and processes. In accordance with certain aspects of the disclosure, such downstream thermomechanical devices and processes include but are not limited to, a heat recovery system, a generator, a mechanical load, or other thermomechanical devices and processes now known or hereinafter developed.

The rate of change of the fuel flow, step S125, as embodied by the disclosure, can also be adjusted or throttled during the rate of change of the fuel flow change itself. For example, a rate of change of the fuel flow can decrease as measured exhaust temperature approaches the desired exhaust temperature setpoint. This rate change of the fuel flow slows the change of the fuel flow maximum value to avoid the sensed temperature from exceeding to decreasing past the desired exhaust temperature setpoint.

The fuel flow to gas turbine 10 can be controlled by control 18 by changing shaft speed (NPT) as long as method 100 process, as embodied by the disclosure, is within boundaries. In accordance with aspects of the embodiments, these boundaries include:

a) Temperature sensed at the closest stage of the combustor to gas turbine 10 does not exceed the maximum exhaust temperature limit. The maximum exhaust temperature limit is determined by the operator and set in control 18.

b) Production by gas turbine 10 is above a minimum limit established. The minimum production limit is determined by the operator and set in control 18.

c) Production by gas turbine 10 is below the maximum limit established. The maximum production limit is determined by the operator and set in control 18.

Once the measured exhaust temperature with respect to a desired exhaust temperature setpoint is within the predetermined range, or any process limit is reached, temperature matching algorithm 25 in control 18 stops compensating fuel flow rate. Thereafter, the process, as embodied by the disclosure, goes to steady state operation.

As embodied by the disclosure, data or inputs are provided to control 18, temperature matching algorithm 25 analyzes dynamically, and automatically in real-time based on site conditions. This real-time analysis versus static algorithms and programming via general relationships permits gas turbine 10 to operation at a "live" or real-time level to provide a gas turbine owner with desirable gas turbine production.

As embodied by the disclosure, control 18 may be provided in the form of a computer and includes temperature matching algorithm 25 that factors at least a turbine shaft/rotor speed reference (NPT), ambient temperature, and the sensed exhaust temperature to control gas turbine production for enhanced performance. These factors are used by control 18 and temperature matching algorithm 25 to determine a differential shaft speed (NPT), either an increase or decrease, desired to modify and to operate gas turbine 10 and its related components, including but not limited to, combustor 14, at an enhanced or optimum production, based on an exhaust temperature target.

Temperature matching algorithm 25 in control 18 includes calculations that can be performed in real-time, dynamically, and automatically. Thus, an operator of control 18 need not have to reprogram temperature matching algorithm(s) time after time. As used herein, real-time refers to occurring at a substantially short period after a change in data or inputs affecting the outcome, for example, computational calculations. In the illustrative embodiment, calculations are updated in real-time with a periodicity determined by the scan time and clock speed of control 18.

An aspect of the embodiments is that control 18 of an existing power plant, such as but not limited to, can be in a combined cycle power plant (CCPP). Additionally, certain aspects of the embodiments provide can provide a control 18, as embodied by the disclosure, for control of an auxiliary power unit, industrial gas turbine, industrial gas turbine for power generation, industrial gas turbine for mechanical drive, micro turbines, or any other turbine now known or hereinafter developed.

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could a suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

Approximating language, as used herein throughout the specification and claims, may be applied to modify any quantitative representation that could permissibly vary without resulting in a change in the basic function to which it is related. As used herein, "approximately" indicates +/−10% of the value, or if a range, of the values stated. Accordingly, a value modified by a term or terms, such as "about," "approximately" and "substantially," are not to be limited to the precise value specified. In at least some instances, the approximating language may correspond to the precision of an instrument for measuring the value.

Here and throughout the specification and claims, range limitations may be combined and/or interchanged; such ranges are identified and include all the sub-ranges contained therein unless context or language indicates otherwise. "Approximately" as applied to a particular value of a range applies to both end values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method for operating a gas turbine at a desired gas turbine production value, the method comprising:
   determining each of an exhaust temperature of the gas turbine and an ambient temperature at the gas turbine during operation of the gas turbine;
   setting a desired gas turbine production value based on a schedule of a reference gas turbine shaft speed with respect to the ambient temperature and the exhaust temperature;
   comparing values of a gas turbine shaft speed to the reference gas turbine shaft speed to determine whether a difference between the gas turbine shaft speed and the reference gas turbine shaft speed is within or outside of a predetermined range;
   determining that the difference between the gas turbine shaft speed and the reference gas turbine shaft speed is outside of the predetermined range; and
   in response to the difference being outside of the predetermined range, initiating a change in gas turbine shaft speed to cause the gas turbine to operate approximately at the desired gas turbine production value.

2. The method according to claim 1, wherein the change in gas turbine shaft speed is one of increasing the gas turbine shaft speed or decreasing the gas turbine shaft speed.

3. The method according to claim 1, the method including at least one of:
   sensing the gas turbine shaft speed;
   sensing the ambient temperature; and
   sensing the exhaust temperature.

4. The method according to claim 1, wherein the method occurs in real-time.

5. The method according to claim 1, wherein the gas turbine comprises an aeroderivative gas turbine.

6. The method according to claim 1, wherein determining whether the difference between the gas turbine shaft speed and the reference gas turbine shaft speed is within or outside of the predetermined range is performed by a controller.

7. An apparatus for operating a gas turbine at a desired gas turbine production value, the apparatus comprising:
   a controller configured to:
      determine each of an exhaust temperature of the gas turbine and an ambient temperature at the gas turbine during operation of the gas turbine;
      evaluate the exhaust temperature and the ambient temperature using at least one temperature matching algorithm;
      set a desired gas turbine production value based on a schedule of a reference gas turbine shaft speed with respect to the ambient temperature and the exhaust temperature;
      compare values of the gas turbine shaft speed to the reference gas turbine shaft speed, using the at least one temperature matching algorithm, to determine whether a difference between the gas turbine shaft speed and the reference gas turbine shaft speed is within or outside of a predetermined range; and
      in response to the difference being outside of the predetermined range, initiate a change in gas turbine shaft speed to cause the gas turbine to operate approximately at the desired gas turbine production value.

8. The apparatus for operating a gas turbine according to claim 7, wherein the change in gas turbine shaft speed increases the gas turbine shaft speed.

9. The apparatus for operating a gas turbine according to claim 7, wherein the change in gas turbine shaft speed decreases the gas turbine shaft speed.

10. The apparatus for operating a gas turbine according to claim 7, wherein the gas turbine shaft speed is a sensed gas turbine shaft speed, the ambient temperature is a sensed ambient temperature, and the exhaust temperature is a sensed exhaust temperature.

11. The apparatus for operating a gas turbine according to claim 7, where the gas turbine comprises an aeroderivative gas turbine.

12. A non-transitory computer-readable medium comprising computer-executable instructions for operating a gas turbine, wherein the computer-executable instructions, when executed by a computer processor of a controller, cause the controller to:
   determine each of an exhaust temperature of the gas turbine and an ambient temperature at the gas turbine during operation of the gas turbine;
   set a desired gas turbine production value based on a schedule of a reference gas turbine shaft speed with respect to the ambient temperature and the exhaust temperature;
   compare values of a gas turbine shaft speed to a reference gas turbine shaft speed to determine whether a difference between the gas turbine shaft speed and the reference gas turbine shaft speed is within or outside of a predetermined range; and
   in response to the difference being outside of the predetermined range, initiate a change in gas turbine shaft speed to cause the gas turbine to operate approximately at the desired gas turbine production value.

13. The non-transitory computer-readable medium according to claim 12, wherein the instructions to initiate the change in gas turbine shaft speed are configured to increase the gas turbine shaft speed or decreasing the gas turbine shaft speed.

14. The non-transitory computer-readable medium according to claim 12, wherein the instructions to initiate the change in gas turbine shaft speed are configured to increase the gas turbine shaft speed.

15. The non-transitory computer-readable medium according to claim 12, wherein the instructions to initiate the change in gas turbine shaft speed are configured to increase the gas turbine shaft speed.

16. The non-transitory computer-readable medium according to claim 12, wherein the instructions are executed in real-time.

17. The non-transitory computer-readable medium according to claim 12, wherein the gas turbine shaft speed is a sensed gas turbine shaft speed, the ambient temperature is a sensed ambient temperature, and the exhaust temperature is a sensed exhaust temperature.

* * * * *

UNITED STATES PATENT AND TRADEMARK OFFICE
CERTIFICATE OF CORRECTION

PATENT NO. : 11,525,409 B2
APPLICATION NO. : 17/034801
DATED : December 13, 2022
INVENTOR(S) : Erick Novoa Patino et al.

It is certified that error appears in the above-identified patent and that said Letters Patent is hereby corrected as shown below:

In the Specification

Column 8, Line 4 reads "…range is greater that the predetermined range (described)…" but it should read "…range is greater than the predetermined range (described)…"

Signed and Sealed this
Twenty-fourth Day of January, 2023

Katherine Kelly Vidal
*Director of the United States Patent and Trademark Office*